Dec. 24, 1935.    F. M. OPITZ    2,025,216
AIR CONDITIONING DEVICE
Filed Nov. 20, 1931    6 Sheets-Sheet 1
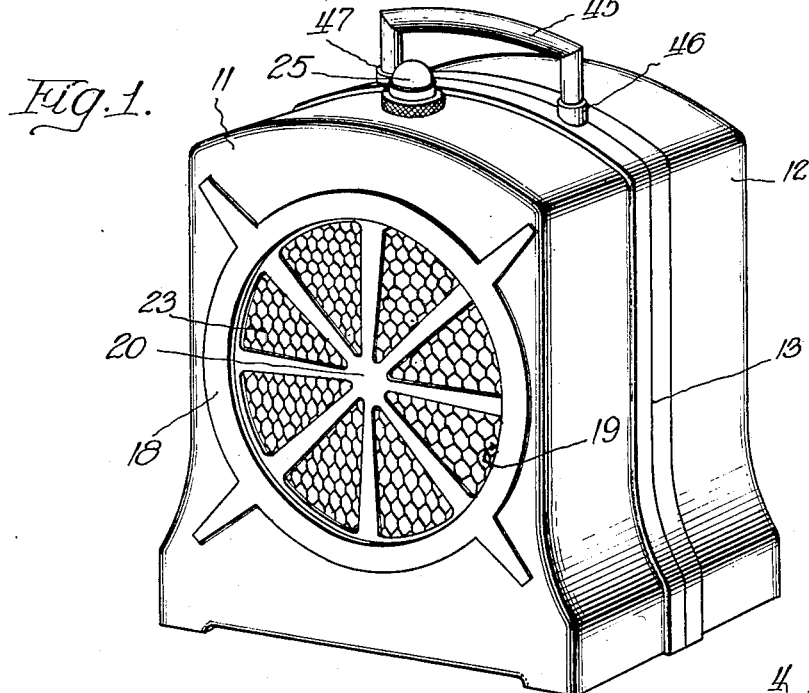
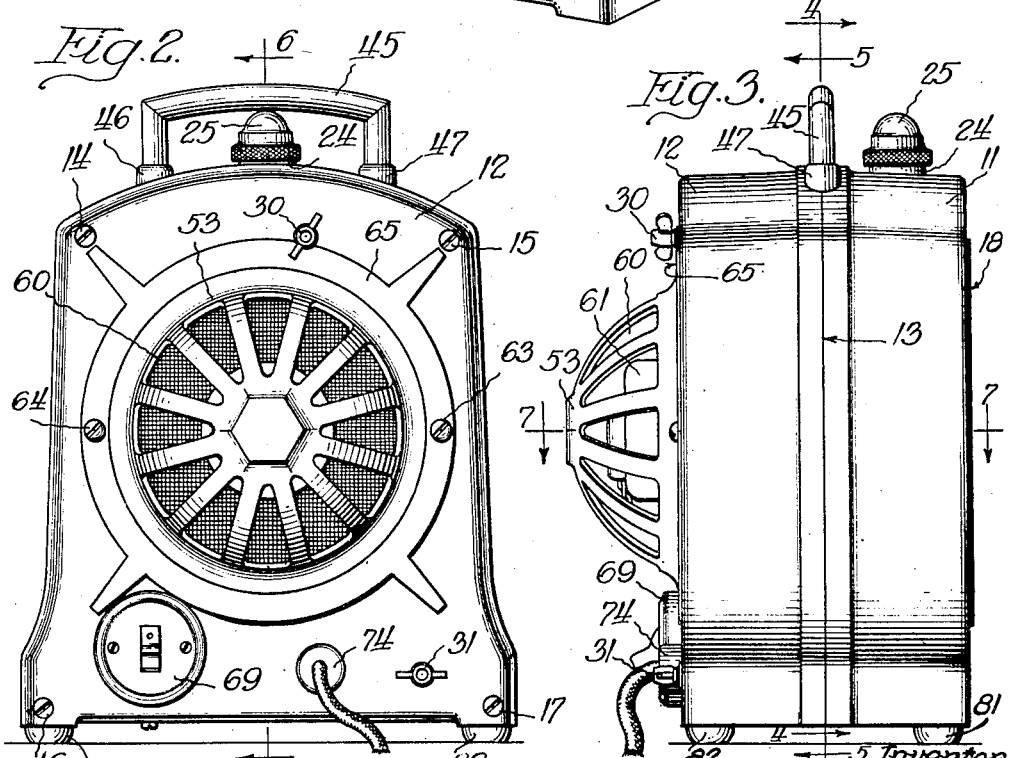

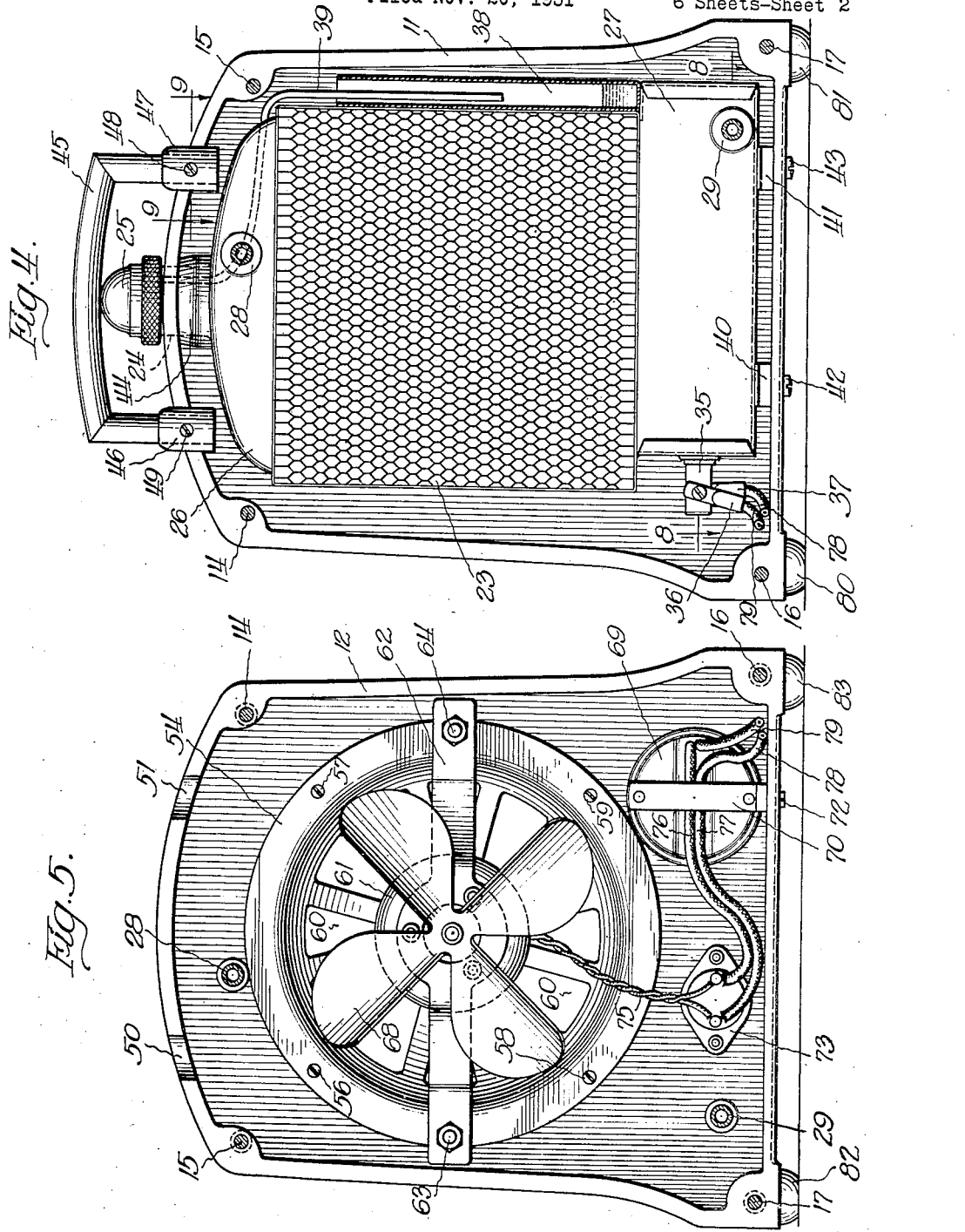

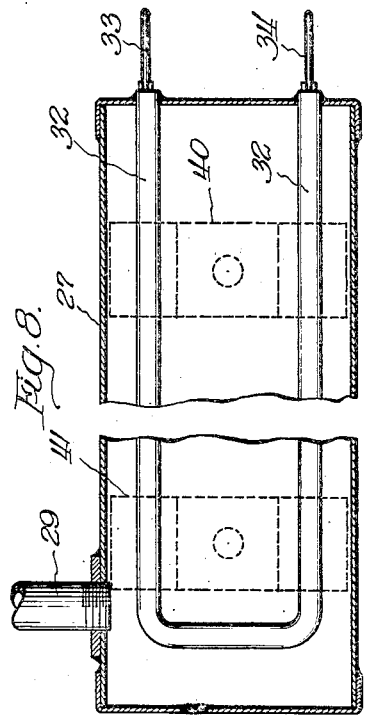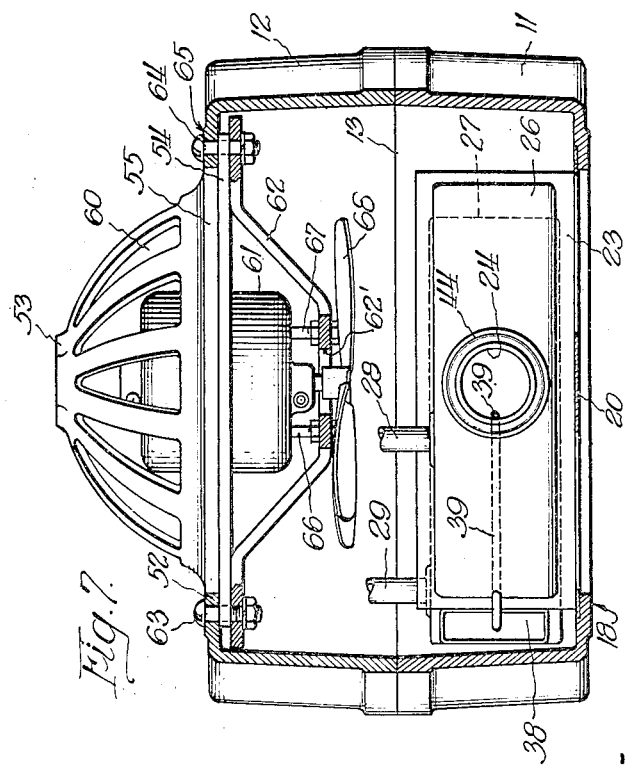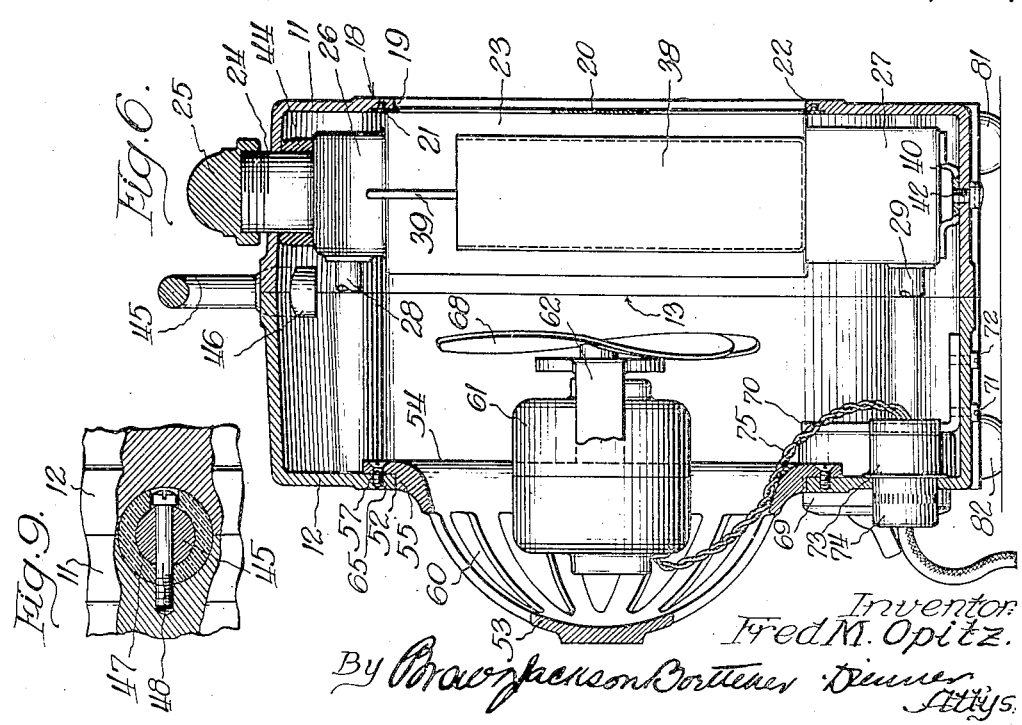

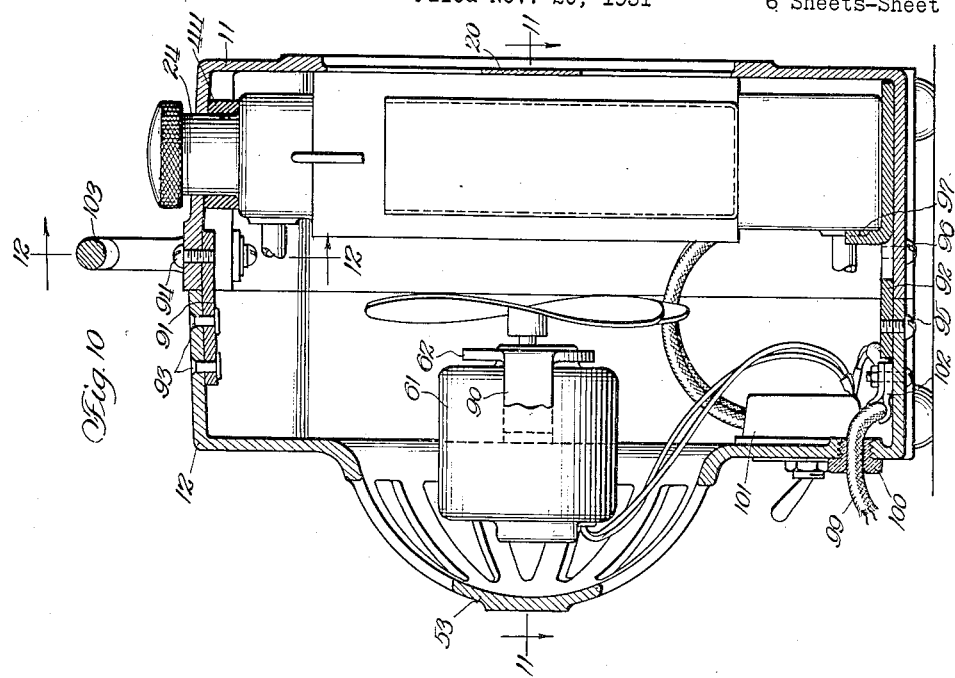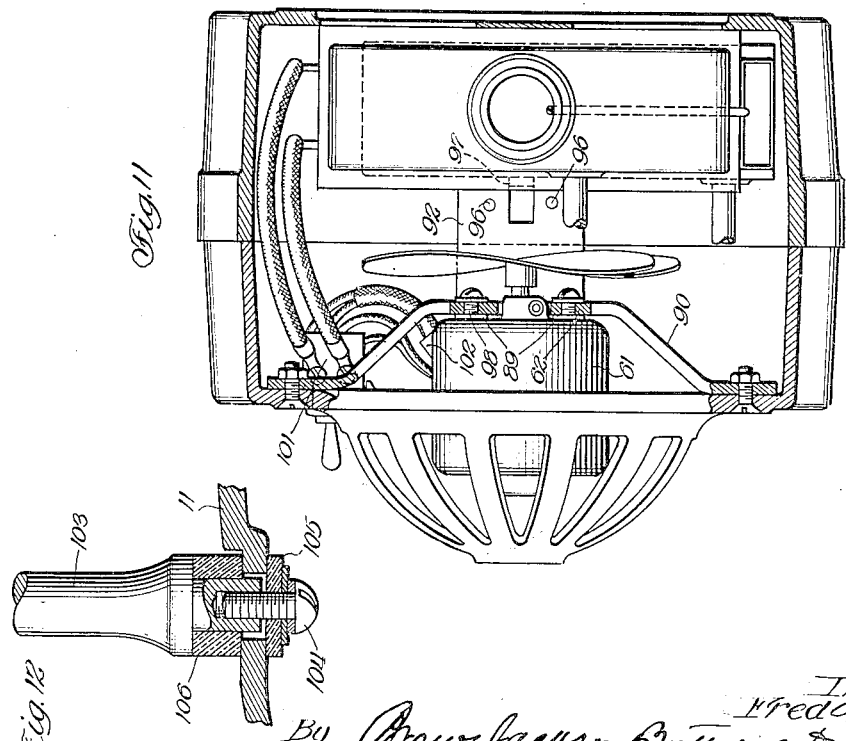

Dec. 24, 1935.  F. M. OPITZ  2,025,216
AIR CONDITIONING DEVICE
Filed Nov. 20, 1931   6 Sheets-Sheet 5
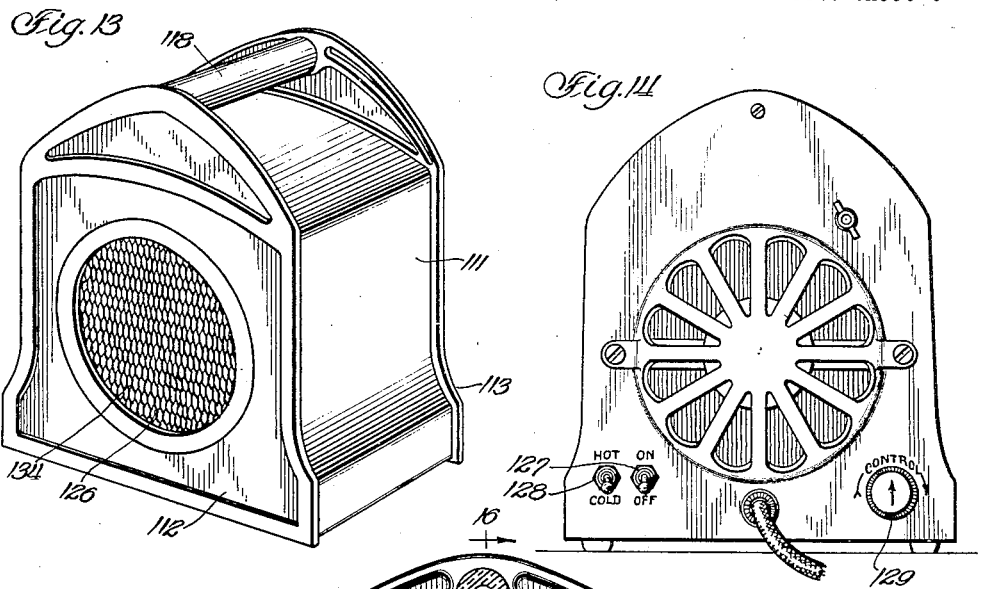
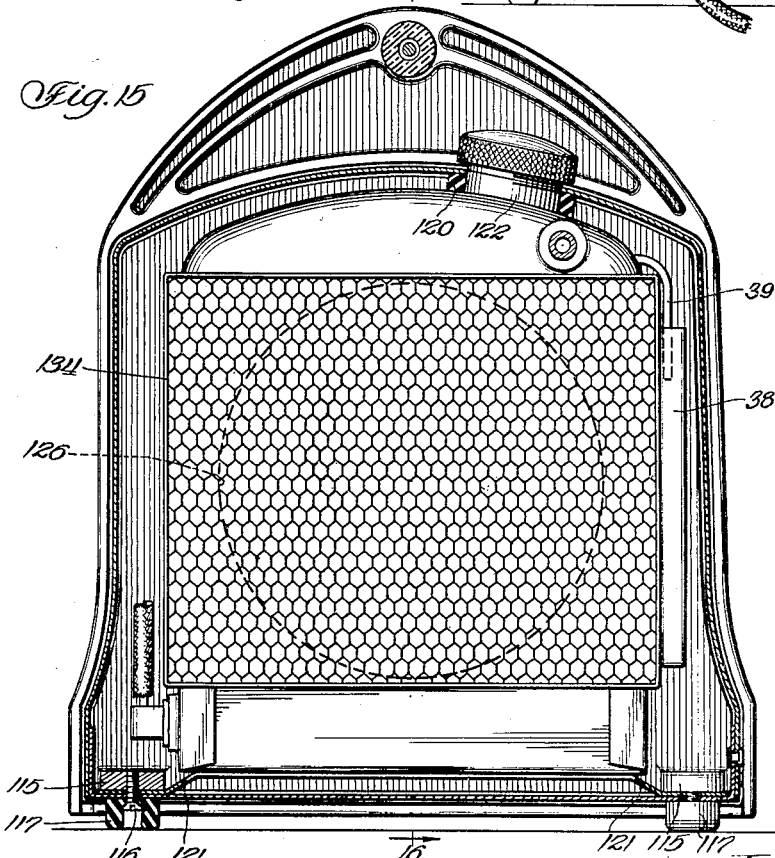

Dec. 24, 1935.  F. M. OPITZ  2,025,216
AIR CONDITIONING DEVICE
Filed Nov. 20, 1931  6 Sheets-Sheet 6
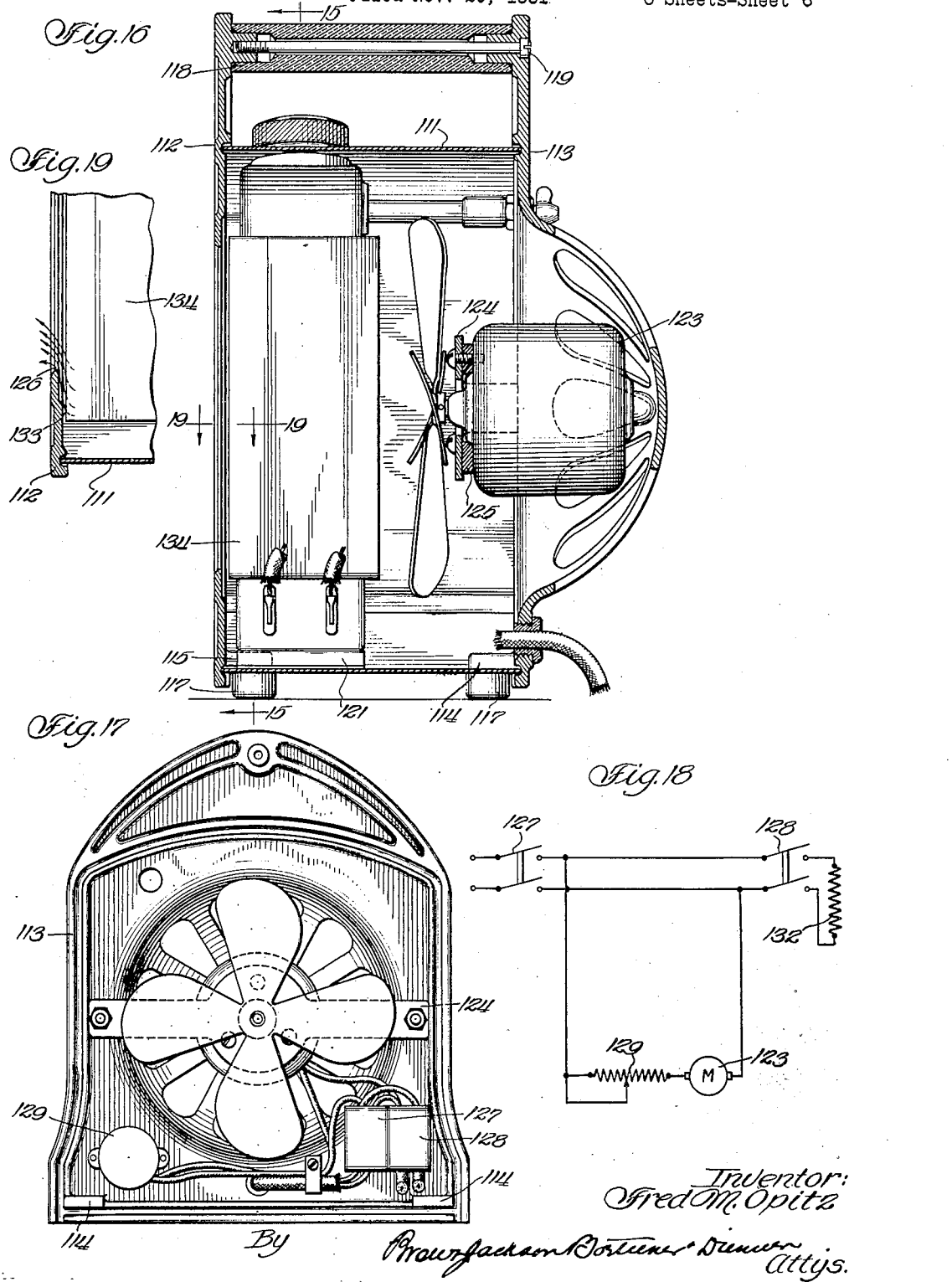
Inventor:
Fred M. Opitz Patented Dec. 24, 1935

2,025,216

UNITED STATES PATENT OFFICE 2,025,216

AIR CONDITIONING DEVICE

Fred M. Opitz, Milwaukee, Wis., assignor to Hexcel Radiator Company, Milwaukee, Wis., a corporation of Wisconsin Application November 20, 1931, Serial No. 576,246

7 Claims. (Cl. 257—9)

My present invention relates broadly to air conditioning devices and is particularly concerned with a novel and improved portable device adapted to either heat or cool the air as may be desired and at the same time to humidify the same. Thus, the invention furnishes a universal light weight portable device which can be used for air conditioning during the hot season as well as during the cold season.

The device consists, generally, of a structural unit composed of two tanks with a radiating core interposed therebetween, and an electric heating element or the like disposed in one of the tanks. An electric motor for driving a fan which is adapted to blow air transversely through the radiating core, or rather to say, through the air passages thereof, is combined with the structure to form a portable unit, with a cord and suitable plugs for connection to a current source. A switch is provided for connecting and disconnecting the heating element. The device will function as a heater when the switch is turned to connect the heating element. The water within the tank in which the heating element is disposed will then be heated, and will circulate, while the fan operates to blow an air stream through the radiator core to dissipate the heat. Certain provisions which I shall presently describe cause humidifying of the hot air stream thus emitted by the device. When it is desired to use the device for cooling purposes, cold water may be poured into the tanks or cool running water may be connected thereto to circulate constantly through the water tubes of the radiator, maintaining the desired degree of temperature, while the fan is actuated by the motor to blow an air stream through the radiator, thus emitting a current of cooled air. The heating element is, of course, disconnected during the operation of the device as a cooling means.

The effect of the device when used for cooling purposes, with the heating element cut off at the switch, will be fully understood when it is considered that the tanks and radiator core are filled with cold water, so that the device delivers an air stream for a considerable length of time at lower than the surrounding air temperature, due to the temperature of the water within the radiator unit.

It is quite necessary to the successful operation of my device that boiling of the water in the radiator be prevented. To this end I use a radiator providing a large surface area in the air ducts so that the required amount of heat may be transferred to the air with the radiator at as low a temperature as possible. I further provide for a free and ample circulation of the water within the radiator so that "hot spots" such as might otherwise form near the heating element are avoided. By thus providing for an efficient transfer of heat, I am able to obtain satisfactory operation of this device with the water temperature considerably below the boiling point.

Other novel features of structural and/or of functional character will appear as the detailed description progresses, which I will now render with reference to the accompanying drawings.

In these drawings:

Figure 1 represents a perspective view of a device embodying my invention;

Figure 2 shows the back of the device with the switch, and the cord plugged into the socket;

Figure 3 is a side view of the assembled device;

Figure 4 is a view into the interior of the front half shell or half casing, showing the radiator core and the water tanks. This view is taken along the line 4—4, looking in the direction of the arrows as shown in Figure 3;

Figure 5 is a view into the interior of the rear half shell or half casing, showing the fan motor and fan, and certain switching provision. This view is taken along the line 5—5 looking in the direction of the arrows as shown in Figure 3;

Figure 6 is a longitudinal section through the assembled casing, taken along the line 6—6 in Figure 2;

Figure 7 is a transverse cross section through the assembled casing, taken along the line 7—7 and looking in the direction of the arrows as shown in Figure 3;

Figure 8 is a section through the bottom tank along the line 8—8 in Figure 4 and illustrates the manner in which the heating element is disposed within this tank;

Figure 9 is a section along the line 9—9 looking in the direction of the arrows as shown in Figure 4, to illustrate the manner in which the handle is fastened in insulated relation to the casing;

Figures 10 and 11 are sectional views of a modification of the device illustrated in Figures 1 to 9;

Figure 12 is a section on the line 12—12 of Figure 10;

Figures 13 and 14 are external views of still another modification of my invention;

Figures 15 and 16 are sectional views of the device shown in Figures 13 and 14. Figure 15 is taken on line 15—15 of Figure 16, and Figure 16 is taken on line 16—16 of Figure 15;

Figure 17 is an internal view of the rear plate of the casing;

Figure 18 is a diagram of the connections to the heater and fan of my device; and Figure 19 is a section on line 19—19 of Figure 16 illustrating one method of regulating the temperature of the air heated by my device.

Referring now to the drawings, and particularly to Figures 1, 2 and 3, it will be seen that the device, as viewed exteriorly, consists of two half shells 11 and 12 which are joined at line 13 to form a casing for housing the various operating parts. The half shells 11 and 12 are secured together by means of bolts 14, 15, 16 and 17 which project through countersunk holes in the half shell 12 and engage threaded holes in the half shell 11. Each half shell or casing is provided at its bottom with two feet, such as shown at 80—81 and 82—83. These feet may be of rubber, or the like.

Referring now again to the description of the Figures 1 to 3, inclusive, it will be seen that the faces of the two half shells 11 and 12 are finished in an ornamental design such as indicated at 18, in connection with the front half casing 11. In the center is a circular opening 19 and attached to this circular opening from the inside of the half shell 11 is a wheel shaped baffle 20. The manner of attachment of this baffle plate will be particularly apparent from the Figure 6, in which the baffle plate 20 is shown to be attached to the inside of the front half shell by means of screws such as 21 and 22. The radiator core is visible through the opening between the spokes of the baffle plate 20 as is indicated by the numeral 23. The top tank is provided with a filler neck 24, and this filler neck projects through an opening in the front half shell as shown. It may be closed by means of the cap 25.

It will be well to examine now the parts disposed within the interior of the front shell or half casing 11 with reference particularly to the Figures 4, 6 and 7.

It will be seen that the radiator unit consists of a radiator core 23 provided with a top tank 26 and a bottom tank 27. The top tank 26 is also provided with a pipe connection 28, and the bottom tank is provided with a pipe connection 29. Both of these pipe connections project from the tanks transversely through the assembled device, that is to say, through the rear half shell of the casing, and attached to these pipes may be valve plugs or cocks such as indicated in the Figures 2 and 3 by the numerals 30 and 31, respectively. The pipe connection 29 at the bottom tank serves the purpose of draining the water from the device, when it is desired, and the filler pipe 28 attached to the top tank 26 may be used for filling water into the radiator unit instead of inserting the water through the filler neck 24. This may be desirable when the device is to be connected to running water, for example, in order to serve as a cooling apparatus instead of as a heating device, as previously mentioned.

Within the bottom tank 27 is disposed a heating element 32 as is particularly apparent from the Figure 8, which shows a cross section through the bottom tank 27 along the line 8—8 in Figure 4. Any one of a number of known and approved heating elements may be used for this purpose. The terminals of the heating element project from the bottom tank as indicated at 33—34, in Figure 8, and attached to each of these terminals may be a suitable terminal member such as indicated in Figure 4 by the numeral 35, for fastening the terminals 36 and 37, respectively, of the connecting wires, to the heating element.

An auxiliary tank 38 is provided on the side of the radiator core 23 as shown, and an overflow pipe 39 connects this auxiliary tank with the filler neck 24. Any overflow or overspill of water, water vapors or steam will be conducted by the overflow pipe 39 into the auxiliary tank 38 and a controlled vaporization will take place for humidifying the air stream forced through the air passages of the radiator core in a manner to be described in detail later on.

The bottom tank 27 is provided with two brackets 40 and 41 for securing the radiator unit within the interior of the half shell or half casing 11. These brackets are secured to the bottom of the half shell 11 by means of screws such as 42 and 43, as is particularly illustrated in the Figures 4 and 6. A rubber ring such as 44 (Figures 4, 6 and 7) may be secured to the filler neck 24, between the top tank 26 and the inner wall of the casing where the filler neck 24 projects therefrom, in order to put the radiator unit firmly in position. This rubber ring will be compressed and will hold the upper portion resiliently but firmly and securely, relieving all stresses and preventing any undesirable movement of the radiator unit within the casing.

A handle 45 is secured to the upper part of the front portion or half shell 11 of the casing along the line 13 where the two half shells join. This handle 45 is fastened in insulated relation to the casing in order to prevent the transmission of heat from the casing to the handle. This is accomplished by means of suitable sleeves of insulating material such as indicated at 46 and 47. The manner in which the handle and the sleeves are fastened to the front portion 11 of the casing is particularly illustrated in Figure 9. It will be seen that a hole is drilled transversely through the insulating sleeve such as 47 and through the corresponding end of the handle 45, with one end of the hole countersunk, for receiving a screw such as the screw 48. This screw in turn engages a threaded opening in the wall of the casing as is indicated in Figure 9. The handle is thus securely attached at each end to the front section of the casing by the two screws 48 and 49, (Fig. 4) with the insulating sleeves 46 and 47 interposed between the handle and the metal of the casing. A transmission of heat from the casing to the handle is therefore only possible by way of the screws such as 48 and 49. Since the cross section of these screws is relatively small, the transmission of heat will be negligible under all conditions of operation. The material of the walls of the top part of the half shell forming the casing, at the center line 13, is bored out for the reception of the handle with its insulating sleeves. Accordingly, when the handle is attached to the front portion of the casing as shown in Figure 4, the rear section of the casing shown in Figure 5 will attach to the front section without any difficulty, since the semi-circular portions of the borings designated by the numerals 50 and 51 will fit around the insulating sleeves 46 and 47, thus permitting a perfect junction of the two half shells forming the casing.

The equipment disposed within the half shell 12 of the casing will be explained next, particularly with reference to the Figures 5, 6 and 7.

The face of the half shell 12 is finished to form an ornamental design similar to the design on the face of half shell 11. This is indicated in Figures 2, 3, 6 and 7 by the numeral 65. In the rear wall of the half shell 12 is an opening as indicated at the line 52 in Figures 6 and 7, and attached to this opening, closing the same, is a spherical protective and ornamental structure 53 having a flange 54 which is larger than the opening and a shoulder 55 fitting into the opening. The attachment is made by joining the shoulder 55 with the circular opening 52 in the rear wall of the casing section 12 and by fastening the flange 54 from the inside to the rear wall by means of screws such as 56, 57, 58 and 59. This rounded ornamental structure 53 is provided with radial slots such as 60 for facilitating the passage of air transversely to the structure during the operation of the device.

A motor 61 is fastened inside of the casing section 12 by means of a bracket 62 which is attached to the rear wall of the casing by means of bolts such as 63 and 64, the bolts being inserted from the outside and the heads of the bolts attaching directly to the ornamental section 65 on the outside, as is shown particularly in Figures 2 and 7. A screen may be provided inside of the spherical portion 53 in order to prevent the entrance of dirt and the like into the device. The attachment of the motor 61 to the bracket 62 is particularly apparent from the Figure 7. It will be seen that the shaft of the motor projects through an opening 62' within the central portion of the bracket 62 while the housing of the motor is attached to the central section of the bracket 62 by means of bolts or the like as indicated in Figure 7 by the numerals 66 and 67. At the end of the shaft of the motor is a fan 68 for sucking the air from the outside through the radial slots or openings such as 60 in the spherical structure 53 and for forcing the air stream through the air passages or air cells of the radiator core 23.

A switch 69 is fastened to the rear housing at the bottom portion, from the inside thereof, and projecting to the outside. A bracket 70 is employed for securing the switch, and this bracket may be fastened to the bottom of the casing by means of screws 71 and 72 as is particularly shown in Figure 6. A socket 73 is also provided within the half section 12 of the casing, and is attached thereto from the inside thereof, as is particularly illustrated in Figures 5 and 6. A cord provided with a suitable plug such as 74 may be connected to this socket 73 thereby connecting current directly to the motor 61 by way of the connecting wires indicated at 75 in Figures 5 and 6, with branch wires 76 and 77 leading to the switch 69 as is particularly shown in Figure 5. Wires 78 and 79 connect with the terminals of the heating element disposed within the bottom tank 27 of the radiator unit which is disposed within the half section 11 of the casing.

It will be seen from the above description that the device consists essentially of two portions, namely, a motor-fan-switch portion disposed in one casing section and a tank-radiator-core portion disposed in the other casing section. The two sections of the casing are joined to form the unitary structure of the air conditioning device as shown in Figures 1 to 3, inclusive. All that is necessary for assembling the sections is to bring the edges of the two half casings into register and to insert the screws 14 to 17, inclusive. Upon tightening these screws, the assembly is completed. This forms a very unique structural unit which is easily assembled and easily taken apart for cleaning, inspection or repair work.

Let us assume now that it is desired to use the air conditioning device as a heating unit. The plug 74 is inserted into the socket 73 and the cord extending from the plug 74 and provided at the other end with a similar plug, is connected to a wall socket carrying current. Since the motor is now directly connected to current it will operate and actuate the fan 68. Air will be sucked through the slots 60 from the rear of the device and will be forced in a stream through the cell structure of the radiator core 23, to be expelled to the outside, at the front of the device. The switch 69 is now operated to connect current to the heating element 32 within the bottom tank 27. The heating element will cause a heating of the water within the bottom tank 27, the water will circulate through the water passages of the radiator core, and, accordingly, will transmit the heat to the core and to the upper tank 26. As the air stream passes through the air passages of the radiator core, the heat will be dissipated. The spokes of the baffle 20 which are placed directly in front of the face of the radiator core will function as hot spots causing a greater generation and accumulation of heat than would otherwise be the case. The size of the spokes of the wheel-shaped baffle will determine the effect thereof. The overflow of water, water vapors and steam will be conducted through the overflow pipe 39 into the auxiliary tank 38 and an evaporation will take place due to the fact that the heat is also transmitted to this auxiliary tank. The vapors will escape from tank 38 and will be sucked into the air stream by the action of the fan. A humidifying of the air stream is thus effected.

Now, when it is desired to use the device for cooling purposes instead of for heating, it will be necessary to connect the cord of the device to a suitable current source as in the former case, while the switch 69 is left in the "off" position, and to put cold water in the radiator core. Preferably, the radiator is filled with ice water. The air will then be cooled in passing through the radiator until the water therein reaches room temperature, whereupon the radiator may be emptied and an additional supply of cold or ice water poured into the radiator. The pipes 28 and 29 may also be connected to a source of running water as has been mentioned previously. It is, of course, possible to use the device simply as a means of setting up a circulation of air.

In Figures 10, 11 and 12 is illustrated a modification of the above described invention which differs therefrom in some of the structural details. The spoked-wheel baffle 20 is cast integral with the front shell 11 of the casing, and the hemispherical member 53 is cast integral with the rear half of the casing 12. The stud bolts 14, 15, 16 and 17 (Fig. 2) holding the two halves of the casing together have been eliminated by the use of two metal strips 91 and 92. Strip 91 is secured to the rear half shell by the rivets 93 and to the front half shell by the screw 94 and the lower strip 92 is secured to the rear half shell by the screw 95 and to the front half shell by the screws 96. A tongue 97 is cut from the strip 92 and bent up as shown in Figure 10 to engage the radiator to hold the same in place. The radiator is as before held in place at its upper end by means of the filler neck 24 and the rubber cushion 44 engaging shell 11.

The motor 61 is as before supported by the strap member 62 in the concavity formed by the member 53, but the arms 90 of the strap member have been shortened to bring the central portion of the member 62 back and in direct engagement with the casing of the motor to which it is secured by means of screws 98. Rubber washers 89 on the screws are interposed between the member 62 and the motor casing.

The socket 73 and the plug 74 shown in Fig. 6 have been eliminated and the cord 99 is brought into the casing through the bushing 100 and connected directly to the switch 101. The cord 99 is anchored inside the case by means of the clamp 102.

The handle 103 is fastened to the front half shell 11 as shown in Fig. 12. The handle is secured by means of screws 104 passing through the casing, and is insulated therefrom by means of the insulating washers 105 and 106.

In Figures 13 to 18 I have illustrated still another modification of my device including several novel features not found in the other constructions. The outer casing is, in this modification, considerably simplified and consists of an open shell 111 (Fig. 13) which is closed at its ends by a front plate 112 and a back plate 113. These plates are provided with lugs 114 and 115 (Figs. 15, 16 and 17) by means of which they are assembled to the hollow shell. The screws 116, which have their heads embedded in the feet 117, pass through holes in the shell 111 and are screwed into tapped holes in the lugs 114 and 115. The plates are held together at their top by means of the handle assembly which consists of a tubular handle 118 and a screw 119, all of which is clearly shown in Figure 16. The radiator 134 is mounted in the front portion of the shell 111 and is secured at its lower end by means of tabs 121 which are soldered to the bottom of the tank and clamped under the lugs 115. It is secured at its upper end by means of the filler neck 122 and the rubber cushion 120, the filler neck being inserted in a hole in the shell 111. The back plate is bulged out to form a concavity on its inner side and the fan motor 123 is mounted therein by means of the strap member 124 to which it is secured by means of screws and the rubber cushion 125. The spoke-shaped baffle shown in the other modifications has here been eliminated and the diameter of the opening has been correspondingly decreased. In Figure 15 the opening 126 is indicated by means of the dotted circle and it can be seen that a portion of the radiator is masked on each side to prevent air passing through the same. This serves to leave a part of the radiator hot, as compared to the portion within the opening 126 so that convection currents are easily set up to aid the free circulation of the water within the radiator as described at the beginning of this specification. While masking of the radiator in this manner is accomplished to some extent in the two modifications first described, it is here carried out much more thoroughly since the masking is better arranged to define vertical paths for the circulation of the water.

In Figure 19 I have shown the radiator 134 spaced away from the plate 112 so that the masking of the side portions of the radiator is not complete since air may flow through the radiator core into the space 133 and thence out the opening 126. Moving the radiator back in this manner permits air to flow through more of the air passages of the radiator core, and since the constricted air passages of the radiator offer most of the resistance to the air flow, the total air resistance of the device will be decreased by the opening of these additional passages, and the volume of the issuing air will therefore be increased.

Therefore, the adjustment of the position of the radiator with respect to the baffle will vary the volume of the air flow and will therefore vary the temperature rise of the air passing through the device.

Movement of the radiator then constitutes a means of adjusting the air temperature which may be employed as a factory adjustment.

In Figures 14 and 17 are illustrated two snap switches 127 and 128 and a control rheostat 129. The connection diagram is shown in Figure 18. Switch 127 is a line switch by which the device is switched on and off and switch 128 serves to disconnect the heater 132 whenever the device is to be used as a cooling or air circulating means. Rheostat 129 is connected in the motor circuit to control the speed of the fan and thereby to control the temperature of the air issuing from the device as explained at the beginning of this specification. Thus the user of the device may adjust the temperature of the issuing air to suit his fancy by merely adjusting the control knob of the rheostat 129. This adjustment is, of course, supplementary and in addition to the factory adjustment which consists in making the opening 126 of the proper size and/or in adjusting the radiator position.

It will be understood that I do not intend to be limited to any particular type of motor, because electric motors and their methods of control are well known to the art. I prefer, however, to use a series connected motor and have therefore shown the motor 123 as having but two terminals.

While I have disclosed a specific and preferred embodiment of my invention, I do not wish to be limited thereto, but intend to include all such embodiments, and all modifications and variations thereof, as fall within the scope of the appended claims.

I claim:

1. In a portable air conditioning device, a vertical radiator unit comprising a radiator core, a tank disposed at each end of said core and communicating therewith, a heating element disposed in one of said tanks, an auxiliary overflow tank and communicating means for conducting the overflow from said unit thereto, access means for inserting liquid into said unit, and separate access means for the upper one of said tanks.

2. In a portable air conditioning device, a radiator unit comprising a radiator core, a tank disposed at the top and at the bottom of said core and communicating therewith, a heating means disposed in one of said tanks, access means on said top tank for inserting liquid into said unit, an auxiliary overflow tank and means communicating with said access means in said top tank for conducting the overflow into said auxiliary tank, and separate access means for the upper one of said tanks.

3. In a portable air conditioning device, a radiator unit adapted to contain a fluid, means in said unit for generating a desired temperature in said fluid within said unit, an air current generating unit for forcing an air stream through said radiator unit to dissipate the temperature thereof, and means in said radiator unit to catch and retain the overflow and vapors from the radiator unit for humidifying said air stream.

4. In a portable air conditioning device, a radiator unit for generating a desired temperature above or below surrounding air temperatures, an air current generating unit for forcing an air stream through said radiator unit to dissipate the temperature thereof, said radiator unit comprising an open housing enclosing a radiator core, a top tank and a bottom tank communicating therewith, access means for inserting liquid into said tanks and core, an auxiliary tank, and means communicating with said access means for conducting overflow and vapors from said top tank to said auxiliary tank to vaporize therein for humidifying said air stream forced through said radiator unit, a heating element being disposed within said bottom tank for generating heat within said radiator unit, and said air current generating unit comprising an open companion housing enclosing a motor, a fan secured thereto, a switch and circuit connections from said switch to said heating element in said radiator unit, socket means for connection with a current source and circuit connections from said socket to said motor and to said switch, means for securely joining the open sides of said housings to form a unitary assembly, and a handle disposed at the juncture of said housings in insulated relation thereto.

5. In a portable air conditioning device, a radiator unit for generating a desired temperature above or below surrounding air temperatures, an air current generating unit for forcing an air stream through said radiator unit to dissipate the heat thereof, said radiator unit comprising an open housing enclosing a radiator core, a top tank and a bottom tank communicating therewith, access means for inserting liquid into said tanks and core, an auxiliary tank, means communicating with said access means for conducting overflow and vapors from said top tank to said auxiliary tank to vaporize therein for humidifying said air stream forced through said radiator unit, and a heating element being disposed within said bottom tank for generating heat within said radiator unit, and said air current generating unit comprising an open companion housing, a motor enclosed therein, and a fan secured to the motor, and means for securely joining the open sides of the housings to secure said units together.

6. In a portable air conditioning device, means for generating a desired temperature above or below surrounding air temperatures comprising a tank unit containing water and comprising a pair of vertically spaced headers communicating through an intermediate core unit, and heat controlling means within said bottom one of said headers in direct thermo-conductive contact with said water, means for forcing an air stream through said core unit to temper said air stream by conduction, control means therefor, and planar baffle means disposed immediately in front of and cooperating with the front vertical surface of said core unit to restrict air passage through certain portions of said core unit to effect localized heating of said portions for increasing the thermal circulation of water within said tank.

7. In a portable air conditioning device, a vertical radiator unit containing water and comprising a radiator core, headers at the top and bottom of said core communicating therewith, a heating element disposed in direct contact with the water in the bottom header comprising an electrical resistance unit encased in insulation within a metal tube extending horizontally into said lower header, a housing for said radiator unit having bottom, side and top walls, means for rigidly supporting said unit in spaced relation on said bottom wall and out of contact with said side walls, and resilient cushioning means between the top header and the inner surface of said top wall of said housing for accommodating expansion of said radiator unit upon heating thereof.

FRED M. OPITZ.